United States Patent
Maruta et al.

(10) Patent No.: US 9,246,564 B2
(45) Date of Patent: Jan. 26, 2016

(54) GENERATING PRECODERS FOR USE IN OPTIMISING TRANSMISSION CAPACITY BETWEEN AN ENODEBB AND UE IN A DL MU-MIMO COMMUNICATIONS SYSTEM

(71) Applicant: NEC Corporation, Tokyo (JP)

(72) Inventors: Yasushi Maruta, Tokyo (JP); Duong Pham, Victoria (AU)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/404,122

(22) PCT Filed: Apr. 12, 2013

(86) PCT No.: PCT/JP2013/061691
§ 371 (c)(1),
(2) Date: Nov. 26, 2014

(87) PCT Pub. No.: WO2013/179806
PCT Pub. Date: Dec. 5, 2013

(65) Prior Publication Data
US 2015/0131753 A1 May 14, 2015

(30) Foreign Application Priority Data
May 28, 2012 (AU) ................................. 2012902211

(51) Int. Cl.
*H04B 7/04* (2006.01)
*H04B 7/06* (2006.01)

(52) U.S. Cl.
CPC ............ *H04B 7/0456* (2013.01); *H04B 7/0452* (2013.01); *H04B 7/0626* (2013.01); *H04B 7/0639* (2013.01)

(58) Field of Classification Search
USPC .......................................... 375/267; 370/332
See application file for complete search history.

(56) References Cited

U.S. PATENT DOCUMENTS

| | | | |
|---|---|---|---|
| 2009/0016459 A1* | 1/2009 | Kim et al. ...................... | 375/262 |
| 2015/0003553 A1* | 1/2015 | Nammi ......................... | 375/267 |

(Continued)

FOREIGN PATENT DOCUMENTS

JP      2009-71825      4/2009

OTHER PUBLICATIONS

International Search Report PCT/JP2013/061691 dated Jul. 16, 2013.

(Continued)

*Primary Examiner* — Eva Puente
(74) *Attorney, Agent, or Firm* — Young & Thompson

(57) ABSTRACT

This method of generating precoders is used in optimising transmission capacity between an eNodeB and UEs in a DL MU-MIMO communication system. The method includes the steps of computing correlation values between pairs of precoding matrices (PMs) of the reported precoding matrix indicators (PMIs) (step 40), selecting a PM pair having a minimum correlation value (step 42). If the minimum correlation value is less than a lower threshold $T_{min}$, the method uses a PM corresponding to the received PMI (step 44). If the minimum correlation value is greater than $T_{min}$ and less than an upper threshold $T_{max}$, the method includes the steps of computing correlation values of the reported PMI and Channel Matrices (CMs) from a fixed codebook of representative CMs (step 48), selecting a CM pair having a maximum correlation value (step 52), and computing precoders from the selected CM pair (step 54).

6 Claims, 5 Drawing Sheets

(56) References Cited

U.S. PATENT DOCUMENTS

2015/0016425 A1* 1/2015 Cui et al. .................. 370/332
2015/0110215 A1* 4/2015 Wang et al. ................ 375/267

OTHER PUBLICATIONS

Mohammad Ali Khojastepour, Xiaodong Wang, Mohammad Madihian, "Design of Multiuser Downlink Linear MIMO Precoding Systems With Quantized Feedback", Vehicular Technology, IEEE Transactions on, Nov. 2009, vol. 58, Issue: 9, pp. 4828-4836.

Mustapha Amara, Yi Yuan-Wu, Dirk Slock, "Performance of Closed Form and Iterative MU-MIMO precoders for different broadcast channel configurations", Communications and Networking (ComNet), 2010 Second International Conference on, Nov. 2010, pp. 1-7.

Hui Shen, Bin Li, Meixia Tao, Xiaodong Wang, "MSE-Based Transceiver Designs for the MIMO Interference Channel", Wireless Communications, IEEE Transactions on, Nov. 2010, vol. 9, Issue: 11, pp. 3480-3489.

3GPP TS 36.213 V8.2.0 (Mar. 2003), 3rd Generation Partnership Project; Technical Specification Group Radio Access Network; Evolved Universal Terrestrial Radio Access (E-UTRA); Physical layer procedures (Release 8), internet (http://www.quintillion.co.jp/3GPP/Specs/36213-820.pdf).

JP Office Action, dated Oct. 13, 2015; Application No. 2014-557268.

Zhang et al., "Joint Linear Transmitter and Receiver Design for the Downlink of Multiuser MIMO Systems," IEEE Communications Letters, vol. 9, No. 11, Nov. 2005, pp. 991-993.

\* cited by examiner

GENERATING PRECODERS FOR USE IN OPTIMISING TRANSMISSION CAPACITY BETWEEN AN ENODEBB AND UE IN A DL MU-MIMO COMMUNICATIONS SYSTEM

TECHNICAL FIELD

The present invention relates to a method and system for transmitting data in a downlink multiple-user multiple-input multiple-output (DL MU-MIMO) communication system, and in particular to the generation of precoders for use in optimising transmission capacity between an eNodeB and UEs (user equipments) in such a communication system.

BACKGROUND ART

In a DL MU-MIMO system the eNodeB transmits data to different UEs on the same time-frequency resources from multiple transmit antennas. To minimise interference between UEs, the eNodeB creates transmission beams through precoding. At the receiving site, a UE uses post-coding (decoding) to take (decode) its data.

In the DL MU-MIMO system, also the eNodeB can transmit different data to one UE on the same time-frequency resources from multiple transmit antennas. The number of the data for one UE is defined as rank.

In communication systems, feedback about the status of the downlink channel between a transmitter and a receiver is employed in order to optimise transmission of data over the downlink channel. The receiver determines the downlink channel status information (CSI) from received pilot signals, and then communicates this CSI to the transmitter, or UE determines the downlink CSI from received pilot signals, and then communicates this CSI to eNodeB, for use in altering the rank, precoding matrices, coding rate and modulation scheme for downlink transmission used in subsequent data transmissions. In 3GPP TS36.213 (V10.5.0), the channel status information includes rank indication (RI), precoding matrix indicator (PMI), and channel quality indicator (CQI). PMI and RI are used for DL MIMO systems.

CITATION LIST

Non Patent Literature

NPL 1: 3GPP TS 36.213 V8.2.0 (2008-03), [searched on Feb. 28, 2013], internet
(http://www.quintillion.co.jpi3GPP/Specs/36213-820.pdf)

SUMMARY OF INVENTION

Technical Problem

Current techniques used in MU-MIMO systems for precoding are not optimal when the CSI used to alter the precoding matrices are not orthogonal between the paired or among the grouped UEs and eNodeB applies non orthogonal precoding matrices between the paired or among the grouped UEs. Such as PMIs are not orthogonal between the paired or among the grouped UEs and eNodeB applies the PMIs. There currently exists a need to improve MU-MIMO communication system precoding performance in such cases.

Solution to Problem

With this in mind, one aspect of the invention provides a method of generating precoders for use in optimising transmission capacity between an eNodeB and a UE in a MU-MIMO communication system.

This method includes the steps of:
receiving a reported precoding matrix indicator (PMI) from the UE;
computing correlation values between pairs of precoding matrices (PMs) of the reported PMIs;
selecting a PM pair having a minimum correlation value;
if the minimum correlation value is less than a lower threshold, using a PM corresponding to the received PMI; and
if the minimum correlation value is greater than the lower threshold and less than an upper threshold,
i) computing correlation values of the reported PMI and the channel matrices (CMs) from a fixed code book of representative CMs,
ii) selecting a CM pair having a maximum correlation value; and
iii) computing precoders from the selected CM pair.

Advantageously, a method including these steps enables the generation of optimised precoders without requiring the reported PMIs transmitted from the UE to the eNodeB to be orthogonal. Joint transmit and receive optimisation is therefore obtained without channel state information, but rather is based upon the PMI feedback information transmitted by the UE.

In one of more embodiments of the invention, the step of computing precoders from the selected CM pair includes:
iteratively computing the precoders based on postcoders and then computing the postcoders based on the precoders until a convergent threshold is achieved.

In one of more embodiments of the invention, the step of iteratively computing the precoders includes
a. initializing the postcoders;
b. computing the precoders based on the available postcoders and the computed Lagrange multiplier;
c. computing the postcoders based on the precomputed precoders and the estimated noise variance; and
d. computing the convergent as the total squared difference between the postcoders at the current iteration and the postcoders at the previous iteration and stopping if the convergent is less than a threshold or otherwise repeating b. onwards.

In one of more embodiments of the invention, the method further includes an initialisation process including:
setting up a minimum Lagrange value and a maximum Lagrange value; and
computing a singular value decomposition of the CM and postcoder by:
computing the product of a Hermitian transposed CM and a Hermitian transposed postcoder for each UE;
computing the product of the postcoder and the CM each UE;
computing the product of the products computed above for each UE;
computing the sum of the products above for all UEs; and
computing the singular value decomposition of the sum of the product above.

In one of more embodiments of the invention, the method further includes the iterative steps of:
e. computing the value of the Lagrange multiplier as the average of the min and the max values;
f. computing the estimated power as a function of the singular values and the Lagrange multiplier; and
g. computing the convergent as the squared difference between the estimated power and the power and stopping if the convergent is less than a threshold or otherwise assigning the computed Lagrange as the min value if the estimated power is greater than the power the computed Lagrange as the max value if the estimated power is small than the power and then returning to step e.

In one or more embodiments, computing the noise variance is based on the reported CQI according to the following steps:
looking up a CQI table for the SINR associated with the reported CQI for each UE; and
computing the variance as the ratio of the average power per UE to the average SINR per layer for each UE.

It will be appreciated that reference herein to any matter which is given as prior art is not to be taken as an admission that that matter was, in Australia or elsewhere, known or that the information it contains was part of the common general knowledge of a skilled address at the priority date of the claims forming part of this specification.

BRIEF DESCRIPTION OF DRAWINGS

FIG. 1 is a schematic diagram of one embodiment of a DL MU-MIMO communication system;
FIG. 2 is a graphical depiction of the transmission of downlink data and uplink channel information transmitted between an eNodeB and UEs forming part of the MU-MIMO system shown in FIG. 1;
FIG. 3 is a flowchart depicting steps carried out by the eNodeB of the MIMO communication systems shown in FIG. 1 in relation to UE selection and precoding procedure;
FIG. 4 is a flowchart depicting steps involved in the computation of j-MMSE precoders forming one of the steps carried in FIG. 3;
FIG. 5 is a flowchart showing a series of steps performed in the computation of a Lagrange multiplier forming part of the process depicted in FIG. 4;
FIG. 6 is a flowchart depicting steps involved in the computation of noise variances based upon CQIs forming part of the process depicted in FIG. 4.

DESCRIPTION OF EMBODIMENTS

It will be appreciated that reference herein to any matter which is given as prior art is not to be taken as an admission that that matter was, in Australia or elsewhere, known or that the information it contains was part of the common general knowledge of a skilled address at the priority date of the claims forming part of this specification.

Figure 1:
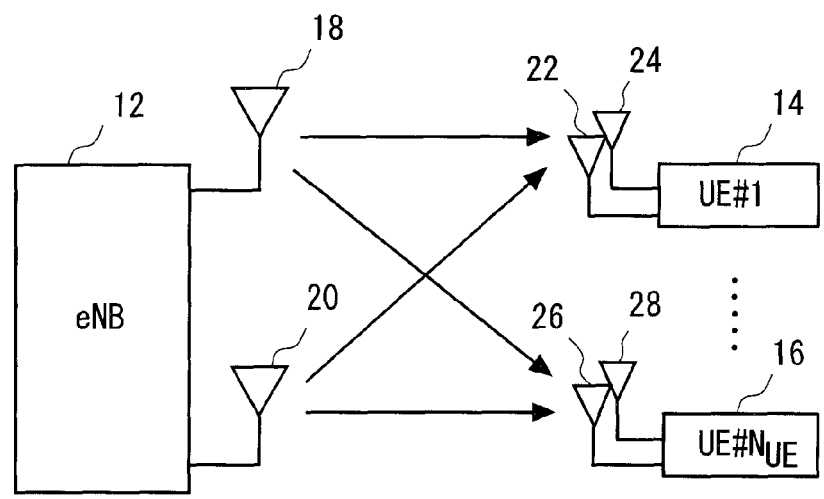
[FIG. 1]

Referring now to FIG. 1, there is shown generally a MIMO communication system 10 including an eNodeB 12 and UEs 14 and 16 adapted to receive from and transmit to the dNodeB. The eNodeB 12 includes multiple antennas 18 to 20 whereas each eNodeB includes multiple antennas here referenced 22 to 28. It will be appreciated that the number of antennas depicted in FIG. 1 is exemplary only and that any suitable number of transmit and receive antennas may be implemented.

The eNodeB modulates and encodes data desired to be transmitted to the UEs 14 and 16. Code words generated from the modulation and encoding are mapped to data transmission layers. Accordingly, data is transmitted from the eNodeB 12 to UEs 14 and 16.

The use of multiple transmit and receive antennas in the MIMO communication system 10 enables the eNodeB 12 to encode and transmit data on a number of spatial channels independently, possibly with different rates. Each transmit and receive antenna pair creates a different radio-antenna chain through which data may be transmitted. The precoding matrices applied at the eNodeB enable increased throughput of the multiple layers by the UEs 14 and 16.

Each UE 14 and 16 computes noise power estimates, signal power estimates and channel estimates between the eNodeB 12 and that UE. The computed estimates are used to determine preferred coding matrix index (PMI) data, rank data and channel quality indicator (CQI) data for transmission to the eNodeB 12 to be used for modulation encoding, mapping and precoding so as to optimise transmission capacity between the eNodeB 12 and the UEs. In this context, "rank" is the preferred number of layers used for transmission, "precoding matrix index" (PMI) is the index of the preferred coding matrix in a rank R-associated sub code book where the eNodeB 12 pre-multiplies its signal by the precoding matrix corresponding to this index for improved transmission. The "channel quality indicator" (CQI) for each of the code words consists of the following information:

a) coding rate, or equivalently, transport block size (TBS);
b) modulation scheme (MS) including QPSK, 16 QAM, 64 QAM;
c) preferred subbands for code words to be mapped.

In other words, to minimise interference between UEs, the eNodeB creates transmission beams through precoding. At the receiving site, a UE uses post coding (decoding) to identify data intended for that UE.

Mathematically, a MU-MIMO system is described as follows:

$$y(i) = H(i)V(i)x(i) + \sum_{k=1, k \neq i}^{N_{UE}} H(i)V(k)x(k) + n(i) \qquad \text{[Math. 1]}$$

where:
y(i) is the received signal vector of size NRX×1 at the i-th user,
x(i) is the data signal vector of size RI(i)×1 for the i-th user,
H(i) is the channel matrix of size $N_{RX} \times N_{TX}$ at the i-th user,
V(i) is the precoder matrix of size $N_{TX} \times RI(i)$ for the i-the user,
n(i) is the additive white Gaussian noise vector of size $N_{RX} \times 1$ at the i-th user.

Figure 2:
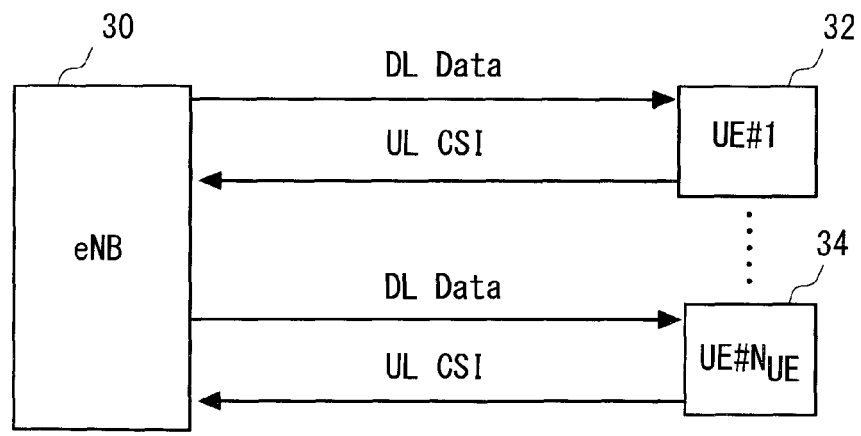
[FIG. 2]

Here
$N_{RX}$ is the number of receive antennas at the UE
$N_{TX}$ is the number of transmit antennas at the eNodeB
RI(i) is the rank or number of transmit layers for the i-th user
$N_{UE}$ is the number of users being scheduled FIG. 2 depicts transmission mechanism between an eNodeB 30 and exemplary UEs 32 and 34 whereby the eNodeB transmits data to different UEs. To minimise inter-user interference, the UEs feedback their channel status information (CSI) which includes (PMI) to the eNodeB. When the PMIs are orthogonal, the eNodeB uses the UEs reported PMIs as precoders to form the transmission beams. However, this technique for precoding is not optimal when the PMIs (precoders) are not orthogonal.

Figure 3:
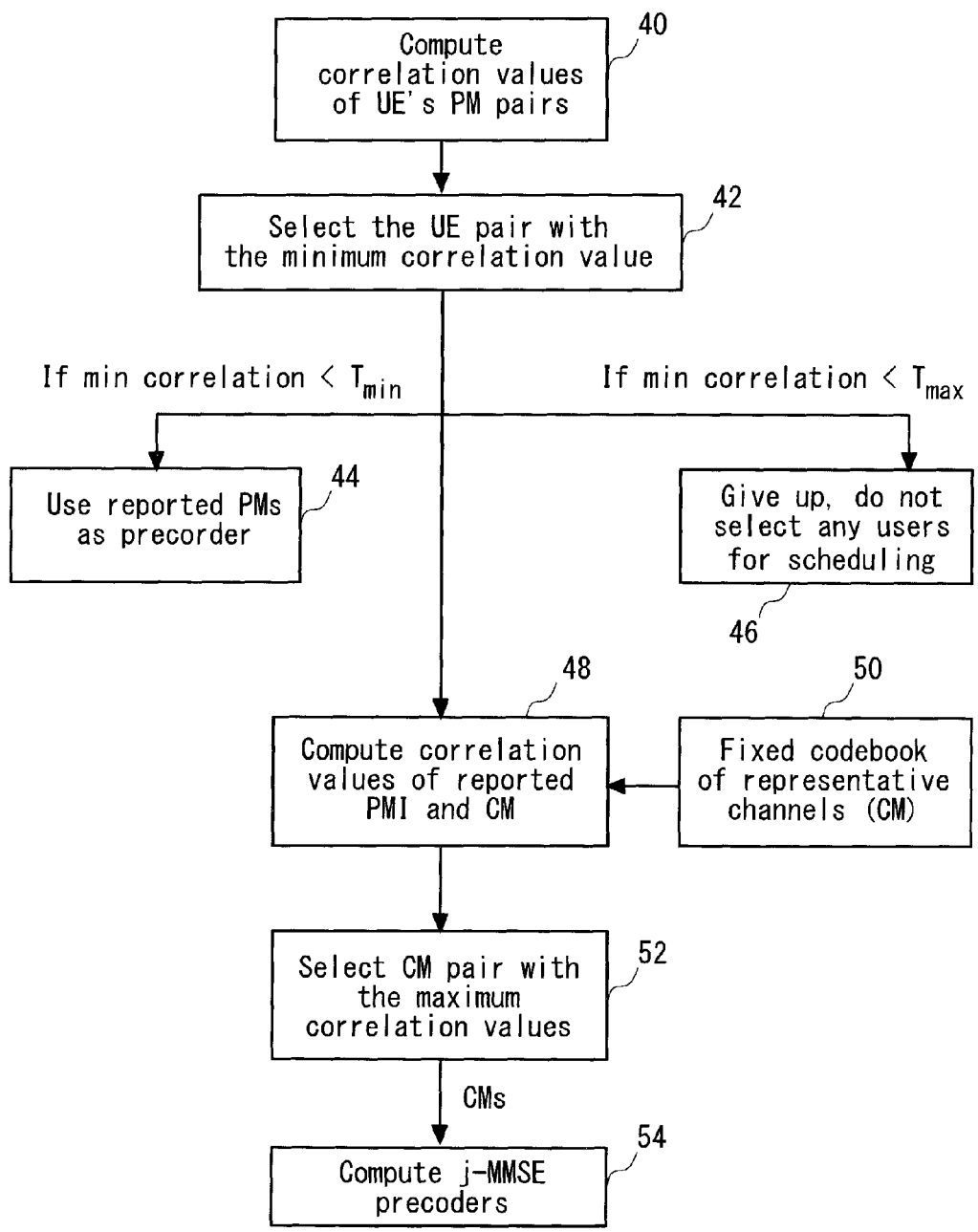
[FIG. 3]

FIG. 3 depicts steps carried out by the eNodeB 12 (and eNodeB 30) to compute precoders on a joint transmit and receive optimisation method that uses the PMI feedback without reference to channel. The precoder presented herein is named a j-MMSE precoder.

As depicted in FIG. 3, once the eNodeB has received reported precoder matrix indicators (PMIs) from the UEs, correlation values are computed between pairs of precoder matrices (PMs) of the reported PMI at step 40.

The correlation values are then calculated, and the minimum value determined; as follows:

$$C_{corr}(i,j)=tr\{[W^H(\hat{p}(i))W(\hat{p}(j))]^H[W^H(\hat{p}(i))W(\hat{p}(j))]\}i=1,\ldots,\Phi-1,j=i+1,\ldots,\Phi \quad \text{[Math. 2]}$$

where:

$W(\hat{p}(i))$ denotes the precoder matrix corresponding to the reported PMI $\hat{p}(i)$ of the i-th UE from the standard LTE codebook $(i=1, \ldots, \Phi)$.

$\Omega_H$ the fixed codebook of representative channel matrices (CM)

$T_{min}$ the Correlation Min threshold.

$T_{max}$ the Correlation Max threshold.

Next, a PM pair having a minimum correlation value is determined at step 42 as follows:

$$C_{corr}(\tilde{i},\tilde{j})=\min\{C_{corr}(i,j)\},$$

$$(\tilde{i},\tilde{j})=\arg\min\{C_{corr}(i,j)\}. \quad \text{[Math. 3]}$$

If the minimum correlation is less than a lower threshold a PM corresponding to the received PMI is then used at step 44, as follows:

If $C_{corr}(\tilde{i},\tilde{j})<T_{min}$ then assign the reported PMs as precoders $$V(\tilde{i})=W(\hat{p}(\tilde{i})),$$

$$V(\tilde{j})=W(\hat{p}(\tilde{j})). \quad \text{[Math. 4]}$$

If the minimum correlation is greater than a predetermined maximum, no users are selected for scheduling at step 46.

However, if the minimum correlation value is greater than the lower threshold and less than the upper threshold, then at step 48, correlation values of the reported PMI and channel matrices (CMs) from a fixed code book 50 of representative CMs are computed. At step 50, a pair of CMs having a maximum correlation value is selected, prior to computation at step 52 of the precoders from the selected CM pair.

Accordingly, the following computations are performed by the eNodeB:

2-1) Find $H(\tilde{n}(\tilde{i})) \in \Omega_H, H(\tilde{n}(\tilde{j})) \in \Omega_H$ with [Math. 5]

$$\tilde{n}(\tilde{i}) = \underset{n}{\operatorname{argmax}}\ tr\{[H(n)W(\hat{p}(\tilde{i}))]^H[H(n)W(\hat{p}(\tilde{i}))]\},$$

$$\tilde{n}(\tilde{j}) = \underset{n}{\operatorname{argmax}}\ tr\{[H(n)W(\hat{p}(\tilde{j}))]^H[H(n)W(\hat{p}(\tilde{j}))]\},$$

$$H(n) \in \Omega_H.$$

2-2) Calculate $N_o(\tilde{i})$, $N_o(\tilde{j})$ using $CQI(\tilde{i},1)$, $CQI(\tilde{j},1)$ as in D)

2-3) Calculate $V(\tilde{i})$, $V(\tilde{j})$ using $N_o(\tilde{i})$, $N_o(\tilde{j})$ and $H(\tilde{n}(\tilde{i}))$, $H(\tilde{n}(\tilde{j}))$ as in B) with Lagrange multiplier computed as in C).

Figure 4:
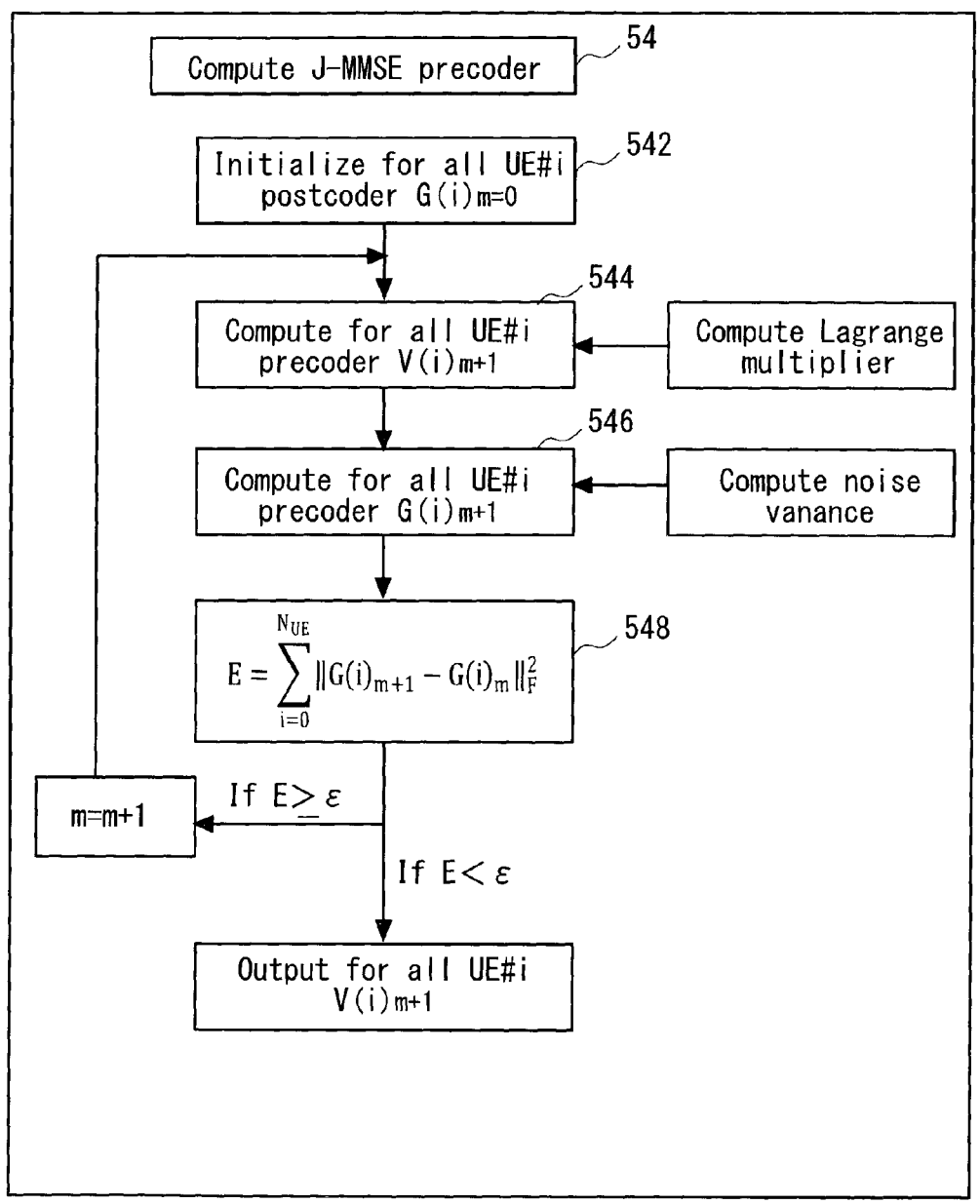
[FIG. 4]

The steps involved in the computation of the precoders at step 54 depicted in more detail in FIG. 4.

Let (m) denote the m-th iteration of the procedure. The precoder is generated as follows:

Step 542: Initialize $G(i)_{(m=0)}=J(i)$, $i=1 \ldots, N_{UE}$. Here $J(i)$ is $RI(i) \times N_{RX}$ matrix with the (a, b)-th element being zero for $a \neq b$ and being 1 for a=b.

Step 544: Compute $V(i)_{(m+1)}$ using

Math. 6 and $G(i)_{(m)}$ for $i=1, \ldots, N_{UE}$.

$$V(i) = \left[\sum_{j=1}^{N_{UE}} H^H(j)G^H(j)G(j)H(j) + \upsilon I\right]^{-1} H^H(i)G^H(i) \quad \text{[Math. 6]}$$

Step 546: Compute $G(i)_{(m+1)}$ using

Math. 7 3 and $V(i)_{(m+1)}$ for $i=1, \ldots, N_{UE}$ (Step 546).

$$G(i) = V^H(i)H^H(i)\left[\sum_{j=1}^{N_{UE}} H(i)V(j)V^H(j)H^H(i) + N_o(i)I\right]^{-1}. \quad \text{[Math. 7]}$$

Step 548: Repeat step 544 and step 546 until $$\sum_{i=1}^{N_{UE}} \|G(i)_{(m+1)} - G(i)_{(m)}\|_F^2 < \varepsilon.$$

Here $\|\cdot\|_F^2$ denotes Frobenius norm and $\varepsilon$ is convergent threshold.

Figure 5:
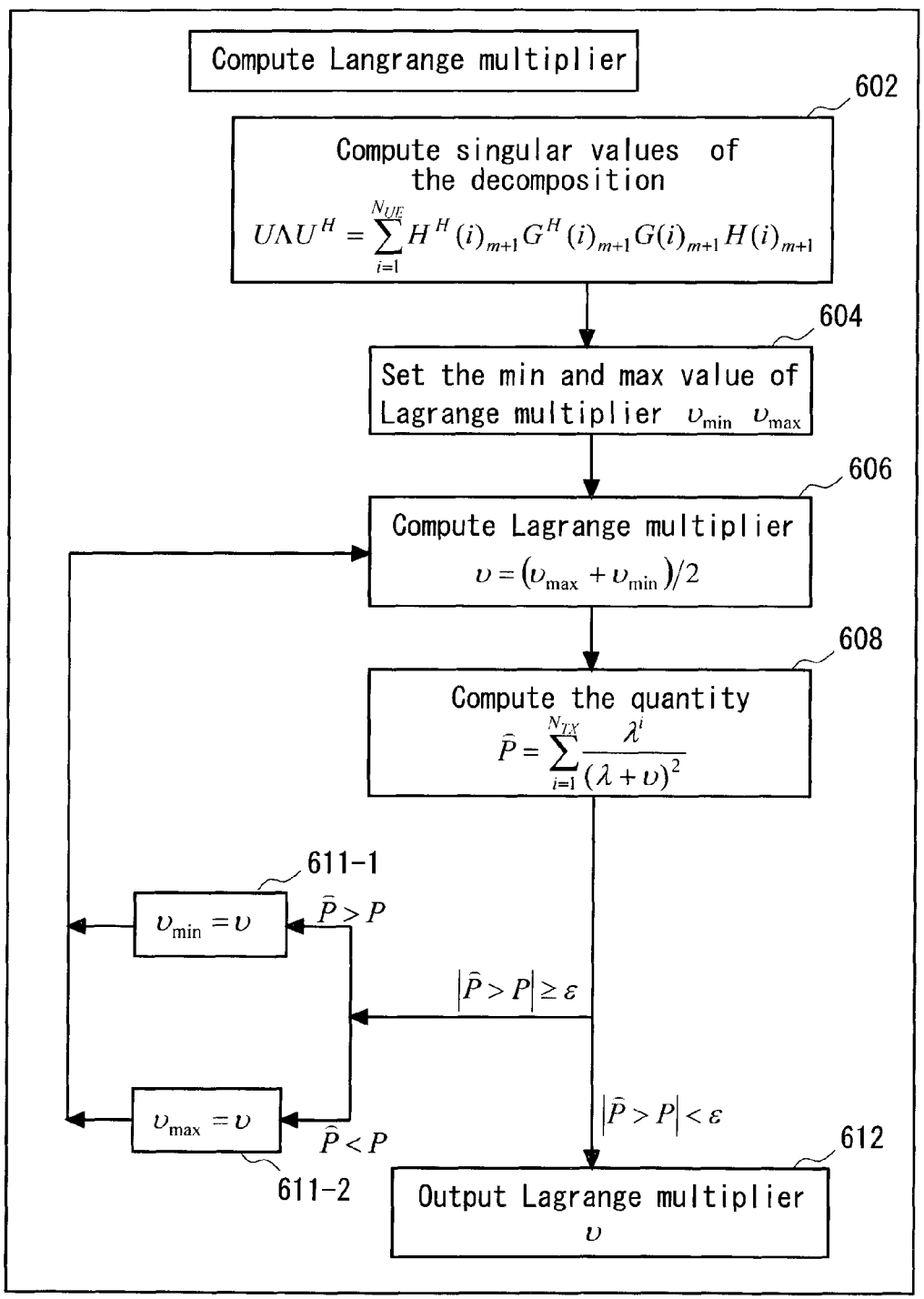
[FIG. 5]

The steps involved in the computation of the Lagrange multiplier shown in FIG. 4 are depicted in further detail in FIG. 5.

Step 602: Compute singular values of the decomposition $$U\Lambda U^H = \sum_{i=1}^{N_{UE}} H^H(i)_{m+1} G^H(i)_{m+1} G(i)_{m+1} H(i)_{m+1}$$

Step 604: Set the min and max value of Lagrange multiplier $\upsilon_{min}$, $\upsilon_{max}$ Step 606: Compute Lagrange multiplier $\upsilon=(\upsilon_{max}+\upsilon_{min})/2$.

Step 608: Compute the following quantity $$\hat{P} = \sum_{i=1}^{N_{TX}} \frac{\lambda_i}{(\lambda_i + \upsilon)^2}.$$

Step 610: Check if $\hat{P}>P$ then set $\upsilon_{min}=\upsilon$ (S610-1) otherwise set $\upsilon_{max}=\upsilon$ (S611-2).

Here P is total transmit power, $P=E\|x\|^2$.

Step 612: Repeat step 606 and step 608 until $|\hat{P}-P|<\varepsilon$.

Here $\varepsilon$ is convergent threshold.

Figure 6:
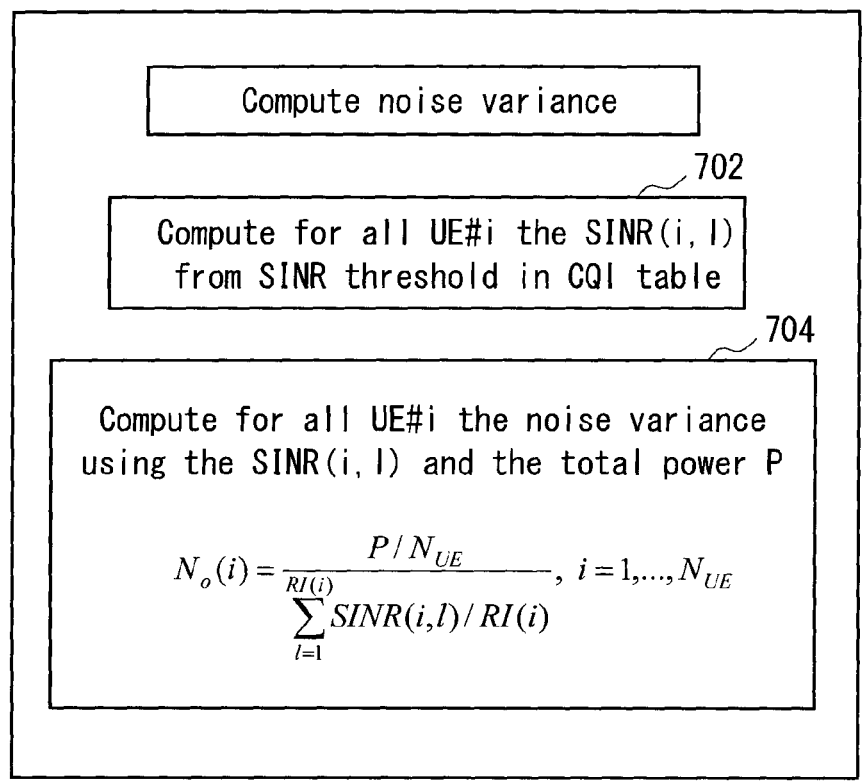
[FIG. 6]

Furthermore, the steps involved in the computation of noise variance shown in FIG. 4, are depicted in further detail in FIG. 6.

Step 702: Find SINR(i, 1) based on the SINR thresholds in CQI table.

Step 704: Calculate $N_o(i)$ using SINR(i, 1) and the total power P as $$N_o(i) = \frac{P/N_{UE}}{\sum_{l=1}^{RI(i)} SINR(i, l)/RI(i)}, i = 1, \ldots, N_{UE} \quad \text{[Math. 8]}$$

Although the exemplary embodiments of the invention have been disclosed for illustrative purposes, those skilled in the art will appreciate that various modifications, additions and substitutions are possible without departing from the scope of the present invention. Therefore, the present invention is not limited to the above described embodiments but is defined by the following claims.

<Incorporation by Reference>

This application is based upon and claims the benefit of priority from Australian Provisional Patent Application No. 2012902211, filed on May 28, 2012, the disclosure of which is incorporated herein in its entirety by reference.

REFERENCE SIGNS LIST

10 MIMO communication system
12 eNodeB
14, 16 UE
18, 20, 22-28 multiple antenna

The invention claimed is:

1. A method of optimising transmission capacity between an eNodeB and at least one user equipment (UE) in a downlink multiple-user multiple-input multiple-output (DL MU-MIMO) communication system, the method including the steps of:
   providing the eNodeB;
   providing the UE;
   a computer receiving a reported precoding matrix indicator (PMI) from the UE;
   the computer computing correlation values between pairs of precoding matrices (PMs) of the reported PMIs;
   the computer selecting a PM pair having a minimum correlation value;
   if the minimum correlation value is less than a lower threshold, using a PM corresponding to the received PMI; and
   if the minimum correlation value is greater than the lower threshold and less than an upper threshold,
   (i) the computer computing correlation values of the reported PMI and Channel Matrices (CMs) from a fixed codebook of representative CMs,
   (ii) the computer selecting a CM pair having a maximum correlation value, and
   (iii) the computer computing precoders comprising a coefficient or matrices from the selected CM pair; and
   optimizing transmission capacity between the eNodeB and the UE with the precoders.

2. The method according to claim 1, wherein the step of computing precoders from the selected CM pair includes:
   iteratively computing the precoders based on postcoders and then computing the postcoders based on the precoders until a convergent threshold is achieved.

3. The method according to claim 2, wherein the step of iteratively computing the precoders includes
   a. initializing the postcoders;
   b. computing the precoders based on available postcoders and a computed Lagrange multiplier;
   c. computing the postcoders based on precomputed precoders and an estimated noise variance; and
   d. computing the convergent threshold as a total squared difference between the postcoders at a current iteration and the postcoders at a previous iteration and stopping if the convergent threshold is less than a threshold or otherwise repeating b. onwards.

4. The method according to claim 3, and further including an initialisation process including:
   setting up a minimum Lagrange value and a maximum Lagrange value; and
   computing a singular value decomposition of the CM and postcoder by:
   computing a product of a Hermitian transposed CM and a Hermitian transposed postcoder for each UE;
   computing a product of the postcoder and the CM for each UE;
   computing a product of the products computed above for each UE;
   computing a sum of the products above for all UEs; and
   computing a singular value decomposition of the sum of the product above.

5. The method according to claim 4, and further including iterative steps of:
   e. computing a value of the Lagrange multiplier as an average of min and max values;
   f. computing an estimated power as a function of the singular values and the Lagrange multiplier; and
   g. computing a convergent threshold as a squared difference between the estimated power and the power and stopping if the convergent threshold is less than a threshold or otherwise assigning the computed Lagrange as the min value if the estimated power is greater than the power, or the computed Lagrange as the max value if the estimated power is less than the power and then returning to step e.

6. The method according to claim 5, wherein computing the estimated noise variance is based on a reported channel quality indicator (CQI) according to the following steps:
   looking up a CQI table for a signal to interference plus noise ratio (SINR) associated with the reported CQI for each UE; and
   computing the estimated noise variance as a ratio of an average power per UE to an average SINR per layer for each UE.

* * * * *